United States Patent Office 3,252,751
Patented May 24, 1966

3,252,751
METHOD OF APPLYING GERMICIDAL MERCURATED ALLYL-s-TRIAZINES TO TEXTILES, OPTIONALLY CREASEPROOFING, AND TEXTILE PRODUCTS THEREOF
John Thomas Shaw, Middlesex, Frank John Gross, Mountainside, and Richard Keith Madison, Murray Hill, N.J., assignors to American Cyanamid Company, New York, N.Y., a corporation of Maine
No Drawing. Original application Jan. 18, 1961, Ser. No. 83,368, now Patent No. 3,130,193, dated Apr. 21, 1964. Divided and this application Apr. 30, 1963, Ser. No. 277,028
5 Claims. (Cl. 8—116.3)

This application is a divisional application of Serial No. 83,368, filed January 18, 1961, and now U.S. Patent No. 3,130,193.

This invention relates to novel germicidal or bactericidal compounds, to their use on textile materials as durable germicidal finishes, to processes for applying such compounds as finishes to textile materials and to the textile materials so treated.

More particularly, this invention relates to novel mercurated allyltriazines as germicidal or bactericidal compounds, to their use on textile materials as durable germicidal finishes, to the processes of applying said compounds as finishes to textile materials, and to the materials so treated.

An object of the present invention is to provide a novel class of mercurial allyltriazines, their formaldehyde condensates, and their alkylated methylol derivatives.

A further object of this invention is to provide a durable antibacterial finish for textile materials and in particular a finish which is durable to laundering in the presence of soaps and/or chlorine, such as is normally employed as chlorine bleach.

A further object of this invention is to provide an antibacterial or germicidal finish which is also capable of contributing dimensional stability and wrinkle resistance to cellulosic materials.

A further object is to provide an antibacterial finishing composition which is compatible with known textile finishing agents or resins, which resins contribute dimensional stability and wrinkle resistance to cellulosic substrates.

A still further object of this invention is to provide a water soluble or water dispersible antibacterial finish which can be applied by standard textile finishing methods, i.e., those normally employed by the textile finishing industry to impart, in addition to a bactericidal finish, wrinkle resistance and shrinkage control to the cellulosic textile material.

These and other objects and advantages of the present invention will become more apparent from the detailed description thereof set forth hereinbelow.

According to the present invention, novel mercurial derivatives of amino-s-triazines are prepared of the formula:

$$\begin{array}{c} R_3 \diagdown \diagup R_4 \\ N \\ | \\ C \\ R_1 \diagdown N \diagup\diagdown N \\ \diagdown N-C \diagup\diagdown C-A \\ R_2 \diagup \diagdown N \end{array}$$

where A is $OR_5$ or $$N \diagup\diagdown \begin{array}{c} R_5 \\ R_6 \end{array}$$

$R_5$ is $$CH_2-\underset{\underset{R_9}{|}}{\overset{\overset{OR_8}{|}}{C}}-CH_2HgX$$

$R_6$ is hydrogen, alkyl, $(-CH_2)_nCH=CH_2$, $$-CH_2-\underset{\underset{R_9}{|}}{\overset{\overset{OR_8}{|}}{C}}-CH_2HgX$$

or $-CH_2-OR_7$, where $n$ is a value of from 1 to 3, inclusive; $R_1-R_4$ is hydrogen, $-CH_2OR_7$, alkyl or phenyl; $R_7$, $R_8$ and $R_9$ are hydrogen or lower alkyl; and X is a monovalent electronegative component or anionic radical such as $CH_3COO$, Cl, etc.

These compounds may be preformed and then applied to the textile substrates or materials or they may be formed in situ on such materials. The mercurial compounds are derivatives of allyl substituted amino-s-triazines with the allyl group attached to a nitrogen or to an oxygen atom which is attached to a ring carbon.

In general, these mercurated alkyl substituted amino-s-triazines are prepared by reacting an appropriate allyl substituted amino-s-triazine with mercuric acetate or a similar mercuric salt in an alcohol or water medium acidified with a weak acid such as acetic acid. The reaction mixture is then stirred while being heated until the reaction is completed.

In an alternative procedure, the allyl derivative of an amino-s-triazine is first applied to the textile material and the material subsequently treated with a hot alcoholic solution of mercuric acetate or similar salt, acidified with a weak acid such as acetic acid.

The values of A, $R_1-R_4$, $R_6$ and $R_9$ in the general formulas will depend on the substitutents in the corresponding positions of the starting compounds. However, the value for $R_8$ is determined by the solvent medium in which the reaction is carried out. If the medium is an alcohol, $R_8$ will be the alkyl radical of that alcohol. When the medium is water, $R_8$ will be hydrogen.

The value of X, the anionic radical, will depend on the anion associated with mercury, of the salt used. If mercuric acetate is employed, the anion will be acetate. If mercuric propionate is employed, the anion will be propionate. However, X may be changed to another electronegative component by reacting the original reaction product, such as the acetate, with a salt such as sodium chloride or silver nitrate, whereby the acetate will be converted to a new salt such as the chloride or nitrate.

In general, the allyl substituted amino-s-triazines employed as starting materials in the preparation of the compounds of this invention are well known and may be readily prepared. The following are illustrative of the allyl amino-s-triazines which may be employed in the present invention: N-allyl substituted melamines such as N-allylmelamine, N,N-diallylmelamine, N-allyl-N'-methylmelamine, N-allyl-N-ethylmelamine, N-allyl-N'-ethylmelamine, N,N-diallyl-N'-n-butylmelamine, N-allyl-N'-methyl-N"-n-propylmelamine, N-allyl-N',N'-dimethylmelamine, N-allyl-N'-phenylmelamine, N,N-diallyl-N'-phenylmelamine, and the 2,4-diamino-6-allyloxy-s-triazines, such as 2-allyloxy-4-amino-6-methylamino-s-triazine, 2-allyloxy-4-ethylamino-6-methylamino-s-triazine and 2-allyloxy-4-amino-6-phenylamino-s-triazine, and the like. It will be apparent that corresponding alkyl substituded allyl derivatives, such as methallyl derivatives, for example, N-methallylmelamine, N-methallyl-N'-methylmelamine and 2,4-diamino-6-methallyloxy-s-triazine are fully contemplated.

The mercuric salts employable are preferably salts of aliphatic organic acids such as formic acid, acetic acid, propionic acid, butyric acid and the like.

The solvent medium in which the mercurated allyl-s-triazines of this invention are employed is preferably an alcohol such as methanol, ethanol, propanol, butanol or the like. However, water and alcohol-water solutions may be employed.

Whether the mercurating medium is alcoholic, aqueous or a mixture, the medium is acidified with a weak, preferably organic acid, such as acetic acid, propionic acid, butyric acid, and the like in order to facilitate the mercuration and prevent hydrolysis of the mercury salt.

While the allylamino-s-triazines of this invention may be mercurated prior to methylolation and alkylation if the latter is carried out, it is greatly preferred that the mercuration be effected on methylolated or alkylated methylolated allylamino-s-triazines. Mercuration of the formaldehyde condensed amino-s-triazines as noted above is carried out on the acid side in an alcoholic or aqueous medium, normally at a temperature of from 25 to 100° C. and preferably at a temperature of from 60 to 80° C. for from two to forty-eight and preferably from sixteen to twenty-four hours. The mercury compound is preferably employed in an amount equal to one equivalent per double bond of the allylamino-s-triazine. While excesses may be employed, such usually presents recovery problems which are undesirable. Excesses of the allylamino-s-triazine may be employed usually up to about 10 mole percent in terms of the number of double bonds present per mole of mercury compound.

The allylamino-s-triazines of this invention may be condensed with formaldehyde to introduce methylol groups on any of the amino-nitrogen atoms which bear a hydrogen atom. These formaldehyde condensates are prepared by reacting the allyl compound with formaldehyde, preferably under alkaline conditions, as for example at a pH of from about 8 to 11. In general, methylolation of the allyl amino-s-triazines of this invention is conducted in accordance with the procedures well known to those skilled in the art for preparing the formaldehyde condensates of such materials as melamine, urea, ethylene urea, trimethylene urea and the like to prepare aminoplast derivatives thereof. Thus, a mole of formaldehyde for each amino-hydrogen sought to be methylolated is introduced into a reaction vessel and under alkaline conditions the reaction mixture would normally be maintained at a temperature of from between 25° C. and 80° C. until condensation is complete. Normally a slight excess of formaldehyde is employed to insure the degree of methylolation sought. Additionally, the methylol groups may be alkylated and formed into alkoxymethyl groups such as N-methoxymethyl by reacting a methylol compound with a suitable alcohol under acidic conditions, normally in the presence of a mineral acid. Suitable acids for such a condensation may be hydrochloric, sulfuric, nitric and the like. Suitable alcohols that may be employed in the process of this invention would include the saturated aliphatic monohydric alcohols and particularly those containing 1 to 4 carbon atoms, as for example methyl, ethyl, propyl, butyl and the like.

As examples of suitable methylol or formaldehyde condensates of the mercurated allylamino-s-triazines of this invention, the following are illustrative: N,N-bis(3-acetoxymercuri - 2 - methoxypropyl) - N′,N″-dimethylolmelamine; N - (3-acetoxymercuri-2-methoxypropyl)-N-allyl-N′,N″-dimethylolmelamine and the like.

As examples of the alkylated methylol derivatives of the mercurated allylamino-s-triazines of this invention, the following are illustrative: N,N-bis(3-acetoxymercuri-2-methoxypropyl) - N′,N′,N″ - tris(methoxymethyl)melamine; N - (3-acetoxymercuri-2-methoxypropyl)-N-allyl-N′,N′,N″-tris(methoxymethyl)melamine; and the like.

By formaldehyde condensates of the mercurated allylamino-s-triazines of this invention it is meant the formaldehyde or alkylated formaldehyde condensates thereof. As will be evident from the disclosure hereinafter, these are the materials employed to provide both a germicidal and a crease-resistant finish to cellulose textile materials. Preferably these compounds contain at least two methylol or alkylated methylol groups on different amino-nitrogens in order to insure cross-linking, and therefore the crease resistance and shrinkage control, in finished cellulosic textile material.

These formaldehyde condensates have the following general formula:

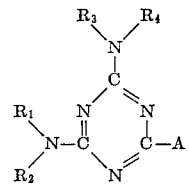

where A is selected from the group consisting of $OR_5$ and

in which $R_5$ is

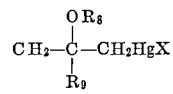

and $R_6$ is selected from the group consisting of hydrogen, alkyl, —$CH_2$—$CH$=$CH_2$,

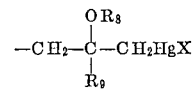

and —$CH_2OR_7$ and where $R_1$–$R_4$ are selected from the group consisting of hydrogen, —$CH_2OR_7$, alkyl and phenyl and at least two of the members $R_1$–$R_4$ and $R_6$, on different amino-nitrogens, are —$CH_2OR_7$ where $R_7$, $R_8$ and $R_9$ are selected from the group consisting of hydrogen and lower alkyl, and X is an anionic radical.

The N-methylol and N-alkoxymethyl derivatives are the preferred germicidal finishes of this invention where maximum durability is desired. These are particularly the preferred bactericidal finishes when the base textile material is of a cellulosic character, as for example, cotton, rayon and the like. Also, N-methylol and N-alkoxymethyl derivatives are preferred when the combination of bactericidal activity and dimensional stability and wrinkle resistance are desired on cellulosic textile materials.

As is well known, in order to cross link between two cellulosic molecules, which reaction is necessary to impart dimensional stability and wrinkle resistance to the cellulose material, it is essential that there be more than one and preferably at least two N-methylol or N-alkoxymethyl groups in each bactericidal molecule to obtain these effects. When the anti-bacterial agents contain at least one methylol group, they are belived to be "fiber reactive germicides." However, they normally will not produce a cross linking that will result in wrinkle resistance and shrinkproofing for cellulose textile materials.

The compounds of this invention are either water soluble or water dispersible and are readily applied to textile materials from aqueous media by any of the well known methods for applying water soluble textile resin finishes. Thus, for example, they may be padded, sprayed, applied by immersion, dipping or any of the other well known finishing techniques.

If desired, a thermosetting aminoplast resin, as for example, of the type well known to the textile finishing industry to be creaseproofing resins, may be applied with the antibacterial agents, either from the same bath or subsequently from a second treating bath or solution.

As examples of suitable thermosetting aminoplast resins contemplated by this invention, the water soluble melamine-formaldehyde resins prepared in accordance with U.S. Patent Nos. 2,197,357 and 2,529,856 are fully contemplated. Examples of such resins are tris(methoxymethyl) melamine, tris(methoxymethyl) dimethylol melamine hexakis(methoxymethyl) melamine, and the like. In addition to these melamine-formaldehyde resins, the urea and thiourea-formaldehyde condensates are contemplated, as are their alkylated derivatives. Thus, for example, dimethylol urea, methylated dimethylol urea and thiourea, dimethylol ethylene urea, dimethylol 1,2-propylene urea and thiourea, dimethylol 1,3-propylene urea and thiourea and other related homologous compounds are contemplated. Additionally, the formaldehyde condensates of dicyandiamide, biuret and the like are contemplated, as are the water soluble formaldehyde condensates of thiobis amides of the type described in U.S. Patent No. 2,887,408.

Guanamine formaldehyde condensates, as for example, those described in U.S. Patent No, 2,887,409, including the formaldehyde condensates of methoxy acetoguanamine, ethoxy acetoguanamine, tertiary butoxy acetoguanamine, and the like are contemplated.

Urons may also be employed with the compounds of this invention as, for example, N,N'bis(methoxymethyl) uron and various other and closely related compounds such as are described in U.S. Patent No. 2,373,135. Additionally, tetrahydro triazones such as tetrahydro-5-($\beta$-hydroxyethyl)-5-triazone and compounds of the type described in U.S. Patent No. 2,304,624 are also fully contemplated.

It has been our experience that when the antibacterial agents of this invention do not contain methylol groups, that greater durability of the germicidal finish is normally obtained by applying a textile resin, as for example, any of the water soluble potentially thermosetting aminoplast resins identified hereinabove in conjunction with the germicidal compounds.

When the germicidal compound contains methylol groups (including alkylated methylol groups) or when a thermosetting aminoplast textile finishing resin is employed in conjunction with the germicidal compounds of this invention, it is advantageous to employ a suitable acid-acting curing catalyst or accelerator such as ammonium sulfate for effecting the cure of these aminoplasts (mercurated methylol compound and thermoseting aminoplast textile finishing resin) on the textile material. It will be apparent that if the mercurated allylamino-s-triazine does not contain methylol or alkylated methylol groups, a catalyst or curing accelerator is not required to fix it upon the textile material, and if a thermosetting aminoplast resin is not subsequently applied, all that is required is that the treated material be dried. Examples of such catalysts are free acids, acid salts, alkanolamine salts, metal salts and the like of the well known types. The concentration of catalyst employed may range from about 0.1 to about 25% or higher based on the weight of resin solids, depending upon the particular catalyst type employed. Thus, for example, from between about 0.1 and about 10% of free acids, such as phosphoric, tartaric, oxalic and the like may be employed, while in the case of ammonium chloride amounts of from between 0.5 and about 10% are used. In the case of amine salts including alkanolamine salts such as diethanolamine hydrochloride, from about 1 to about 10% are most useful, while with respect to salts such as magnesium chloride, amounts of from between about 5 and 25% have been successfully employed. In addition to magnesium chloride, zinc nitrate, zinc borate, aluminum chloride and other known conventional metal salts are normally employed in amounts corresponding to from between 5 and 25%, based on the weight of the resin solids.

After the application of the methylolated mercurated allylamino-s-triazines, with or without the addition of a thermosetting aminoplast resin, the treated textile material is dried and subjected to temperatures normally considered to be the drying and curing temperatures employed for drying and curing for creaseproofing resins in the textile finishing industry. Thus, for example, the treated material may be subjected to temperatures of from between about 180° F. to about 450° F. or higher. Generally speaking, the time of drying and/or curing operations is inversely proportional to the temperature employed and of course is influenced by whether or not separate or combined drying and curing steps are employed. Generally, when drying and curing is carried out in a combined operation, a time of from about 1 minute to about 10 minutes may be employed at temperatures of from 450 to 250° F., respectively. When the fabric has been dried preliminary to curing, curing times of the order of about 5 minutes to about ¼ minute at a temperature of from about 250 and 450° F., respectively, have been successfully employed.

The germicidal finish of this invention may be applied to textile materials or bases, usually in the form of fabric which may be knitted, woven, non-woven or otherwise formed, and which may be prepared from cellulosic or non-cellulosic fibers or mixtures of the two. Thus, the textile material may be a formed fabric of cellulosic fibers, as for example, cotton, linen or viscose rayon or mixtures thereof, or it may be a textile fabric prepared from acetate rayon, nylon, the polyester fibers and acrylic fibers, wool, silk and the like. Additionally, the textile material may be prepared from mixtures of these and other cellulosic and non-cellulosic fibers.

Preferably, the textile material is a cellulosic material formed principally from cellulosic fibers. In this regard, for purposes of this invention, the term "cellulosic fabric" shall mean to include fabrics containing at least 50% by weight of cellulosic fibers, whether they be cotton, viscose rayon, linen or the like.

The antibacterial compounds of this invention are normally applied in an amount of from between 0.0001% to 2.5% on the weight of the textile material. The preferable amount is from between .01% to 1% based on the dry weight of the textile material to which it is applied. In applications where the water soluble thermosetting aminoplast resin is employed in conjunction with the allylamino-s-triazines of this invention, these resins are normally applied in amounts of from between about 1 and about 25% and preferably in amounts of from 2.5 to 10% based on the dry weight of the textile material.

In order that the present invention may be more fully understood, the following examples are given primarily by way of illustration. No specific details or enumerations contained therein should be construed as limiting the present invention except insofar as they appear in the appended claims. All parts and percentages are by weight unless otherwise indicated.

EXAMPLE 1

*N,N-bis(3-acetoxymercuri-2-methoxypropyl)-melamine*

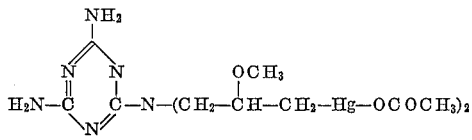

A hot solution of 174.9 parts (0.55 mole) of mercuric acetate and 30 parts of glacial acetic acid in 320 parts of methanol is added to a solution consisting of 51.6 parts (0.25 mole) of N,N-diallylmelamine in 450 parts of methanol at 45° C. The reaction mixture is heated at the reflux for 24 hours, cooled and filtered. The filtrate is concentrated in vacuo, resulting in a thick syrup. The syrup is poured into 4000 parts of acetone, with stirring for several hours. The resultant precipitate is filtered off and then dried in vacuo over phosphoric anhydride.

The hygroscopic product obtained was 122 parts (60.6% yield); M.P. 110° C. to 120° C. and had the following analysis.

Calculated for $C_{15}H_{26}Hg_2N_6O_6 \cdot H_2O$: C, 22.4; H, 3.5; Hg, 49.75; N, 10.4; O, 13.9. Found: C, 22.1; H, 2.93; Hg, 50.2; N, 9.84; O, 13.0.

EXAMPLE 2

*N-(3-acetoxymercuri-2-methoxypropyl)-N-allylmelamine*

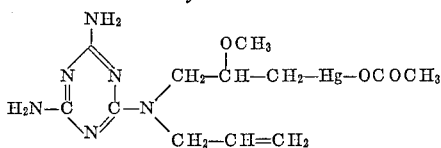

A hot solution of 79.5 parts (0.25 mole) of mercuric acetate and 15 parts of glacial acetic acid in 145 parts of methanol is added to a solution of 51.6 parts (0.25 mole) of N,N-diallylmelamine in 450 parts of methanol at 45° C. The procedure of Example 1 is then followed.

The hygroscopic product, amounting to 63 parts and melting at 152° C. to 160° C. had the following analysis.

Calculated for $C_{12}H_{20}HgN_6O_3$: C, 29.1; H, 4.02; N, 17.0; Hg, 40.2. Found: C, 29.4; H, 3.54; N, 17.2; Hg. 39.4.

EXAMPLE 3

*N-(3-acetoxymercuri-2-methoxypropyl)-N-ethylmelamine*

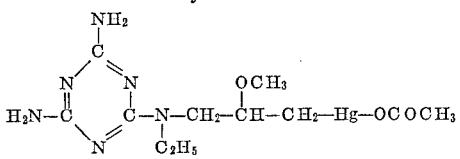

The procedure of Example 2 is followed substituting 48.6 parts of N-allyl-N-ethylmelamine for the 51.6 parts of N,N-diallylmelamine.

EXAMPLE 4

*N,N-bis(3-acetoxymercuri-2-methoxypropyl)-N'-methylmelamine*

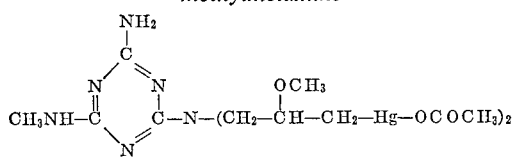

The procedure of Example 1 is followed substituting 55.1 parts of N,N-diallyl-N'-methylmelamine for the 51.6 parts of N,N-diallylmelamine.

EXAMPLE 5

*N,N-bis(3-acetoxymercuri-2-methoxypropyl)-N'-phenylmelamine*

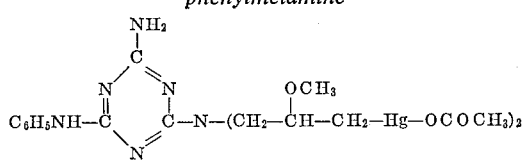

The procedure of Example 1 is followed substituting 70.6 parts of N,N-diallyl-N'-phenylmelamine for the 51.6 parts of N,N-diallylmelamine.

EXAMPLE 6

*N,N-bis(3-acetoxymercuri-2-ethoxypropyl)melamine*

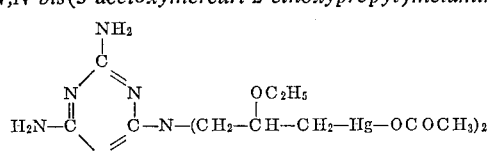

The procedure of Example 1 is followed substituting an equal amount of ethanol for the methanol.

EXAMPLE 7

*Reaction product of N,N-diallyl-N',N',N"-tris(methoxymethyl)melamine and mercuric acetate*

A reaction product of N,N-diallyl-N',N',N"-tris(methoxymethyl)melamine and mercuric acetate is accomplished in a three-step method.

*1st step.*—N,N-diallyl-N',N',N"-trimethylol melamine is prepared by mixing 103 parts (0.5 mole) of N,N-diallylmelamine and 202 parts (2.5 moles) of 37% formalin and heating to 85° C. and the pH adjusted to 8-9 by adding 20% aqueous solution of caustic soda. After maintaining the temperature at 85° C. and the pH at 8-9 for 30 minutes, the resulting solution is cooled to room temperature, whereupon the liquid separates into two layers.

When cooled below 10° C., the lower layer slowly solidifies. The solid material is separated by filtration and dried in vacuo at 50-55° C. over phosphoric anhydride.

The product amounting to 132 parts (yield) had the following analysis.

Calculated for $C_{12}H_{20}N_6O_3 \cdot H_2O$: C, 45.2; H, 7.00; N, 24.4. Found: C, 45.2; H, 6.30; N, 24.0.

*2nd step.*—A mixture consisting of 132 parts (0.42 mole) of N,N - diallyl-N',N',N"-trimethylolmelamine, 158 parts (4.8 moles) of methanol and 0.45 part (.0032 mole) of oxalic acid dihydrate is prepared at room temperature and refluxed for 45 minutes. After cooling, the solution is neutralized to pH 9.6–10.0 with 1 N sodium hydroxide and then filtered and distilled in vacuo.

During distillation two layers are noticed. After removing all of the solvent, a pale yellow viscous syrup remains. The product, N,N - diallyl - N',N',N"-tris(methoxymethyl)melamine amounting to 114 parts (yield) had the following analysis.

Calculated for $C_{15}H_{26}N_6O_3$: C, 53.2; H, 7.7; N, 24.8. Found: C, 52.2; H, 7.3; N, 24.2.

*3rd step.*—Mercuration of product of Step No. 2 is accomplished by preparing two separate solutions.

*Solution "A."*—16.9 parts (0.05 mole) of N,N-diallyl-N',N',N"-tris(methoxymethyl)melamine is dissolved in 91 parts of methanol at room temperature.

*Solution "B."*—34.9 parts (0.11 mole) of mercuric acetate is dissolved in 65 parts of methanol and 6.08 parts by weight of glacial acetic acid at the boiling point.

Solution "B" (boiling) is added to solution "A" while stirring and the combined solutions are refluxed for 24 hours. The resultant product (a slightly turbid solution) is cooled to room temperature, filtered and distilled in vacuo to a syrup which is water soluble.

The yield is 35.0 parts (72%).

EXAMPLE 8

*2-(3-acetoxymercuri-2-methoxypropoxy)-4,6-diamino-s-triazine*

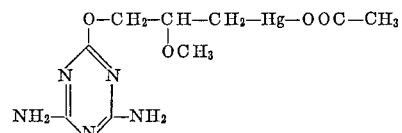

To a solution of 10 parts (0.06 mole) of 2-allyloxy-4,6-diamino-s-triazine in 162 parts of methanol at 33° C. is added (in small portions over ¾ hour period with stirring) 19.1 parts (.06 mole) of mercuric acetate. The resultant mixture is stirred for 24 hours and allowed to stand for 5 days. The milky product is evaporated in vacuo to a syrupy product which is stirred and saturated with 79.2 parts by weight of acetone for 3 hours. The product is filtered and the filter cake washed with acetone and then dried over phosphoric anhydride.

The yield is 21.3 parts; M.P. >320° C.; hygroscopic.

*Analysis.*—Calculated for $C_9H_{15}HgN_5O_4$: C, 22.9; H, 3.21; Hg, 42.4; Found: C, 22.8; H, 2.88; Hg, 43.4; N, 14.4.

EXAMPLE 9

*Procedures of application, drying and washing of fabrics treated with product of Example 1*

APPLICATION

All applications are made from aqueous solutions by padding through a two roll micro-set padder.

The product of Example 1 is applied at various concentrations and by several different methods, i.e.

Method "A"—Product applied alone
Method "B"—Product plus creaseproofing resins
Method "C"—Product applied alone and topped with creaseproofing resin

DRYING AND CURING

The drying or curing of the various treated fabrics is accomplished in hot, circulating air ovens.

Fabrics treated by Method "A" are dried for 2 minutes at 225° F.

Fabrics treated by Method "B" are predried for 2 minutes at 225° F. and then cured for 1.5 minutes at 350° F.

Fabrics treated by Method "C" are predried for 2 minutes at 225° F., then repadded with the creaseproofing resin, dried for 2 minutes at 225° F. and then cured for 1.5 minutes at 350° F.

LAUNDERING

The cotton fabrics treated with the product of Example 1 are laundered in a Laundromat washer as follows and are designed in the tables by code, i.e.

LW=0.1% neutral soap at 140° F.
LWC=0.1% neutral soap plus 0.02% available chlorine at 140° F.

The synthetic or wool fabrics are laundered in a Najort reversing washer employing 0.1% neutral soap at 100° F. followed by rinsing and drying.

AGAR DIFFUSION TEST METHOD

Bacterial inhibition tests are made on treated fabrics by the following method.

Discs (11.5 mm.) of the treated fabrics are placed on an agar plate inoculated with bacteria culture. After several hours of contact, the discs are removed and the plate incubated overnight. The activity of the compound used on the fabric discs is recorded as the diameter (in mm.) of the clear area at the site of the discs. An effective agent will show a clear area with a diameter greater than that of the disc itself (11.5 mm.).

The larger the clear area, the greater is the compound's activity. The activity under the fabric disc is also noted where there is no zone outside the area covered by the fabric. The area under the disc of the fabric is rated as follows:

"C"—Completely clear area underneath disc
"P"—At least 75% clear area underneath disc
"S–VS"—Less than 75% clear area underneath disc
"N"—No clear area The results are shown in Tables I to V.

The following is an explanation of the various treatments used in Example 12 (Tables I through V).

*Table I.*—Applications by Methods "A" and "B" on cotton percale at 0.0001, 0.001, 0.01, 0.1 and 1% solids (O.W.F.) i.e., on the weight of the fabric.

*Table II.*—Applications by Methods "A" and "B" on cotton percale at 0.5% solids (O.W.F.).

*Table III.*—Applications by Methods "A" and "C" on cotton percale at 10% solids (O.W.F.).

*Table IV.*—Applications by Methods "A" and "B" on fabrics of synthetic fibers and also wool flannel at 1% solids (O.W.F.).

*Table V.*—Applications by Method "B" on cotton percale at 1% solids (O.W.F.) with diglycidyl ether as a creaseproofing resin in the bath.

TABLE I.—N,N-BIS(3-ACETOXYMERCURI-2-METHOXYPROPYL)MELAMINE ON 80 x 80 COTTON—VARIATIONS OF CONCENTRATIONS

| Percent Solids (O.W.F.) | | Zones of Inhibition (mm.) | | | | | |
|---|---|---|---|---|---|---|---|
| | | E. coli, | | | Staph. aureus | | |
| | | Initial | 25LW | 25LWC | Initial | 25LW | 25LWC |
| 1.0 | | 19.4 | <12.0 | C; 12.0p | 21.9; 29.0p | 13.2; 27.0p | C; <12.0p. |
| 1.0 | (a) | 17.8 | 13.4 | 13.2 | 21.7; 25.5p | 16.5; 25.3p | 14.5. |
| 0.1 | | 13.6 | NS | N | 14.5; 21.4p | P; 18.3p | VS. |
| 0.1 | (a) | 12.6 | S | C; 12.1p | 13.8; 19.8p | S; 16.7p | 12.1. |
| 0.01 | | VS | N | N | P–C; 16.5p | N | N. |
| 0.01 | (a) | VS | N | C; <12.0p | P–C; 15.3p | N | <12.0. |
| 0.001 | | N | N | N | VS | N | N. |
| 0.001 | (a) | VS | N | P–C; <12.0p | S | N | C. |
| 0.0001 | | N | N | N | N | N | N. |
| 0.0001 | (a) | N | N | P–C; <12.0p | VS | N | C; <12.0p. |

(a) 5% Solids (O.W.F.) tris(methoxymethyl)melamine + 3.5% ammonium sulfate (based on resin solids) in treating bath.

TABLE II.—N,N-BIS(3-ACETOXYMERCURI-2-METHOXYPROPYL)MELAMINE ON 80 x 80 COTTON

| Percent Solids (O.W.F.) | | Zones of Inhibition (mm.) | | | | | |
|---|---|---|---|---|---|---|---|
| | | E. coli, | | | Staph. aureus | | |
| | | Initial | 25LW | 25LWC | Initial | 25LW | 25LWC |
| 0.5 | | 19.2 | C; 12.0p | C; 12.0p | 21.1; 26.5p | <12.0; 21.5p | <12.0; 19.5p. |
| 0.5 | (a) | 16.6 | 12.6 | 15.4 | 20.2; 27.7p | 13.9; 22.6p | 17.1. |

(a) 5% solids (O.W.F.) tris(methoxymethyl)melamine + 3.5% ammonium sulfate (based on resin solids) in bath.

TABLE III.—N,N-BIS(3-ACETOXYMERCURI-2-METHOXYPROPYL)MELAMINE ON 80 x 80 COTTON

| Percent Solids (O.W.F.) | | Zones of Inhibition (mm.) | | | | | | | | |
|---|---|---|---|---|---|---|---|---|---|---|
| | | E. coli | | | | Staph. aureus | | | | |
| | | Initial | 5LW | 5LWC | 25LW | 25LWC | Initial | 5LW | 5LWC | 25LW | 25LWC |
| 1.0 | | 19.4; 20.6p | 13.7 | 13.7 | 12.7 | 12.1 | 24.7; 29.5p | 16.3; 25.7p | 15.6; 22.0p | 14.5; 20.0p | 12.9 |
| 1.0 | (a) | 18.1 | 15.1 | 14.1 | 14.0 | 15.7 | 22.8; 27.0p | 18.8; 24.5p | 15.8 | 18.4; 22.7 | 17.3 |

(a) Topped with 5% solids (O.W.F.) tris(methoxymethyl)melamine plus 12% magnesium chloride (based on resin solids).

TABLE IV.—N,N-BIS(3-ACETOXYMERCURI-2-METHOXYPROPYL)MELAMINE ON VARIOUS FABRICS (1.0% SOLIDS O.W.F.)

| Fabric Used | | Zones of Inhibition (mm.) | | | |
|---|---|---|---|---|---|
| | | E. coli | | Staph. aureus | |
| | | Initial | 25LW | Initial | 25LW |
| Spun Nylon | | 19.0 | P-C | 25.7; 32.9p | C. |
| | (a) | 17.2 | 13.7 | 21.6; 27.2p | 14.9; 20.7p. |
| Spun acrylic fiber. | | 19.9 | VS-P | 24.8; 31.0p | S-P. |
| | (a) | 14.3 | 13.7 | 14.3 | 14.2; 22.9p. |
| Spun polyester fiber. | | 20.1 | VS-P | 25.0; 31.5p | VS. |
| | (a) | 13.1 | 12.6 | 13.6 | 12.6; 21.5p. |
| Taffeta Fil. Acetate. | | 13.5 | S-C | 22.6; 26.7p | C; 19.8p. |
| | (a) | 14.5 | 13.0 | 14.5 | 12.2; 21.6p. |
| Taffeta Nylon Fil. | | 20.5 | VS | 25.6; 32.5p | N-P. |
| | (a) | 13.0 | S-C | 13.0 | P-C; 18.7p. |
| Rayon challis | | 19.3 | P-C | 25.4; 30.1p | C; 32.9p. |
| | (a) | 17.9 | 12.5 | 23.0; 28.1p | 14.0; 23.6p. |
| Acrylic fiber | | 19.9 | C | 25.5; 32.2p | 12.0; 22.7p. |
| | (a) | 13.1 | 12.0 | 13.9 | 12.9; 22.9p. |
| Wool | | *14.2 | N | 18.0; 24.7p | N. |
| | (a) | 14.5 | N | 18.0; 24.0p | N. |

(a) 5% solids (O.W.F.) tris (methoxymethyl)melamine +3.5% ammonium sulfate (based on resin solids) in treating bath. All fabrics washed wool/rayon wash = 0.1% soap at 100° F.
*Uneven zone.

ping with, the creaseproofing resin imparts greater durability. Results on the various synthetic fabrics also show better durability when a creaseproofing resin is used in combination with the product of Example 1.

In a series of applications similar to those set forth in Example 9 employing the product of Example 2, good, durable zones of inhibition to E. Coli are obtained by topping the fabric treated with the product of Example 2 with a creaseproofing resin.

EXAMPLE 10

*Methylolation of N,N-bis(3-acetoxymercuri-2-methoxypropyl)melamine*

A solution consisting of 7.2 parts of N,N-bis(3-acetoxymercuri-2-methoxypropyl)melamine (product of Example 1) in 100 parts of 37% aqueous formaldehyde is prepared by stirring for ½ hour at room temperature, then further diluted with water to give a final solution of 1% of the mercury compound.

Application of the 1% solution using zinc nitrate as a catalyst is made on 80 x 80 cotton fabric at 1% O.W.F. by the previously described manner (Method B, Example 12).

The results are set forth below.

| | Wrinkle Recovery | | Tensile Strength H | | Zones of Inhibition (mm.) | | | | | |
|---|---|---|---|---|---|---|---|---|---|---|
| | | | | | E. coli | | | S. aureus | | |
| | Initial | 5LW | Initial | 5LW | Initial | 5LW | 5LWC | Initial | 5LW | 5LWC |
| Treated | 238 | 223 | 61 | | 15.3 | 12.2 | 12.3 | 19.9; 22.9p | 12.4 | 12.1 |
| Untreated | 140 | | 110 | | | | | | | |

TABLE V.—N,N-BIS(3-ACETOXYMERCURI-2-METHOXYPROPYL)MELAMINE WITH 5% SOLIDS (O.W.F.) DIGLYCIDYL ETHER ON 80 x 80 COTTON

| Percent Solids (o.w.f.) | E. coli | | S. aureus | |
|---|---|---|---|---|
| | Initial | 5LW | Initial | 5LW |
| 1.0 | 19.9 | 14.8 | 21.9; 26.5 | 15.8; 23.9p. |

The results on 80 x 80 cotton percale show good durability after 25LW or 25LWC when 1% of product of Example 1 is used alone. However, addition of, or topping with, the creaseproofing resin imparts greater durability.

These results show good wrinkle recovery and durability of germicidal properties.

EXAMPLE 11

Aqueous solutions of the product of Example 7 at 5 or 15% solids (O.W.F.) plus 12% solids zinc nitrate (based on resin solids) are applied to 80 x 80 cotton percale by padding as described in Method A, Example 9.

The treated fabrics are dried for 2 minutes at 225° F. and cured for 1.5 minutes at 350° F., then washed and dried as previously described in Example 9.

Antibacterial, wrinkle resistance (Monsanto Wrinkle Recovery) and tensile strength (AATTCC) tests are obtained. Results are shown in Table VI.

TABLE VI—MERCURATED N,N-DIALLYL-N',N',N''-TRIS(METHOXYMETHYL)MELAMINE WITH ZINC NITRATE

| Percent Solids (O.W.F.) of Compound | Percent Zn(NO₃)₂ Based on Resin Solids | Tensile (lbs.) | | Wrinkle Recovery (deg.) | | Zones of Inhibition (mm.) | | | | | |
|---|---|---|---|---|---|---|---|---|---|---|---|
| | | | | | | E. coli | | | S. aureus | | |
| | | Initial | 5LW | Initial | 5LW | Initial | 5LW[1] | 5LWC[2] | Initial | 5LW[1] | 5LWC[2] |
| 5 | 12 | 73 | | 181 | 178 | 20.9 | 15.1 | 15.8 | 25.6 | 17.9 | 17.5 |
| 15 | 12 | 60 | | 220 | 213 | 24.2 | 17.4 | 15.0 | 29.4 | 20.5 | 16.8 |
| Untreated | | 106 | | 142 | 137 | | | | | | |

[1] Washed in soap only.
[2] Washed in soap plus a commercial sodium hypochlorite solution (.02% available chlorine).
Treated Fabrics-Dried for 2' at 225° F., Cured 1.5' at 350° F.

Thus, at 15% solids only slight improvement in the zones of inhibition of *E. coli* or *Staph. aureus* is obtained over the 5% solids application. However, at 15% solids a much improved wrinkle recovery is obtained.

EXAMPLE 12

*Polymethylol N,N-diallylmelamine pretreated 80 x 80 cotton percale aftertreated with mercuric acetate*

A swatch of 80 x 80 cotton percale is treated in an aqueous solution (at 5% solids O.W.F.) of polymethylol N,N-diallylmelamine (approximately 3.3 moles of combined formaldehyde per mole of N,N-diallylmelamine) plus 12% (based on resin solids) of magnesium chloride. The treated fabric is dried at 225° F. for 3 minutes and cured at 350° F. for 1.5 minutes.

A portion of this fabric is then extracted with hot dimethylformamide for 4 hours, rinsed in water at 140° F. and air dried.

Percent N on fabric=1.17 (equivalent to 4.2% O.W.F. of polymethylol compound).

The wrinkle recovery was 229° (W+F).

A 7.5 gram sample of the above treated fabric (containing 0.00104 mole of compound durably fixed thereon) is heated at reflux with stirring in a solution of 264 parts of methyl alcohol, 1.05 parts of acetic acid ad 1.33 parts (0.00416 mole) mercuric acetate for 27 hours.

The fabric is then Soxhlet extracted with methanol for 24 hours and air dried.

Percent N on fabric=1.13.

The wrinkle recovery was 212° (W+F).

The treated fabric is washed for 25 cycles in a Laundromat washer and then dried.

(An untreated swatch 80 x 80 cotton is also subjected to the mercuric acetate treatment only.)

Test results are shown in Table VII.

TABLE VII.—80 x 80 COTTON PERCALE PRETREATED WITH POLYMETHYLOL DIALLYLMELAMINE, THEN AFTERTREATED WITH MERCURIC ACETATE

| Treatments | Washes | Zones of Inhibition (mm.) | | Percent Hg on Fabric |
|---|---|---|---|---|
| | | *E. coli* | *S. aureus* | |
| Fabric pretreated with polymethylol diallyl melamine, aftertreated with mercuric acetate. | None | 16.9 | 21.6; 23.0p | [1] 3.21 |
| | 25LW | 14.6 | 18.9; 21.3p | |
| | 25LWC | Not run | | |
| Fabric treated with mercuric acetate only. | None | 12.4 | 13.1 | 0.04 |
| | 25LW | P | <12.0 | |
| | 25LWC | Not run | | |

[1] Theory on basis of nitrogen analysis=5.28% Hg

It will be apparent that the compositions of this invention may be employed in combination with other textile finishing agents, auxiliaries and assistants, as for example, lubricants, dyes, antistatic agents and the like insofar as these materials do not diminish the antibacterial effects sought to be achieved thereby.

We claim:

1. The method of applying a germicidal finish to textile materials which comprises applying thereto in an inert liquid medium from between 0.0001% and 2.5% based on the dry weight of the textile material of a mercurated allyl-s-triazine of the formula:

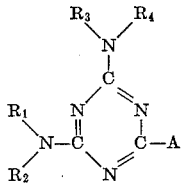

where A is selected from the group consisting of $OR_5$ and

in which $R_5$ is

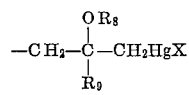

and $R_6$ is selected from the group consisting of hydrogen, lower alkyl, $-CH_2CH=CH_2$ and

and where $R_1-R_4$ are selected from the group consisting of hydrogen, $-CH_2OR_7$, lower alkyl and phenyl, $R_7$, $R_8$ and $R_9$ are selected from the group consisting of hydrogen and lower alkyl, and X is an anionic radical which forms a salt of mercury and thereafter heating the textile material at elevated temperatures.

2. The process according to claim 1 in which a thermosetting creaseproofing resin is applied simultaneously with said mercurated alkyl amino-s-triazine whereby the germicidal finish is more durably bound.

3. The method of applying a germicidal finish to textile materials which comprises applying thereto from an aqueous media between 0.0001% and 2.5% based on the dry weight of the textile material of a mercurated allyl-s-triazine of the formula:

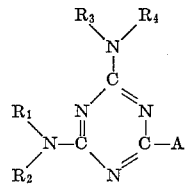

where A is selected from the group consisting of $OR_5$ and

in which $R_5$ is

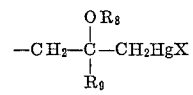

and $R_6$ is selected from the group consisting of hydrogen, lower alkyl, $-CH_2CH=CH_2$,

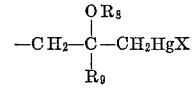

and $-CH_2OR_7$ and where $R_1-R_4$ are selected from the group consisting of hydrogen, $-CH_2OR_7$, lower alkyl and phenyl, and at least two of the members $R_1-R_4$ and $R_6$, on different amino nitrogens, are $-CH_2OR_7$, $R_7$, $R_8$ and $R_9$ are selected from the group consisting of hydrogen and lower alkyl, and X is an anionic radical which forms a salt of mercury and thereafter heating the textile material to elevated temperatures.

4. Textile material having a germicidal finish thereon comprising a mercurated allyl-amino-s-triazine having the following formula:

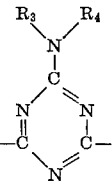

where A is selected from the group consisting of $OR_5$ and

in which $R_5$ is

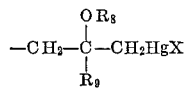

and $R_6$ is selected from the group consisting of hydrogen, lower alkyl, $-CH_2CH=CH_2$ and

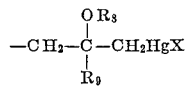

and where $R_1-R_4$ are selected from the group consisting of hydrogen, $-CH_2OR_7$, lower alkyl and phenyl, $R_7$, $R_8$ and $R_9$ are selected from the group consisting of hydrogen and lower alkyl, and X is an anionic radical which forms a salt of mercury.

5. Cellulose textile fabric having a crease-resistant germicidal finish prepared by applying thereto from an inert liquid medium, a mercurated allyl amino-s-triazine and heat curing said triazine, said triazine having the following formula:

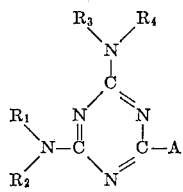

where A is selected from the group consisting of $OR_5$ and

in which $R_5$ is

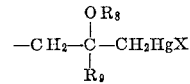

and $R_6$ is selected from the group consisting of hydrogen, lower alkyl, $-CH_2CH=CH_2$,

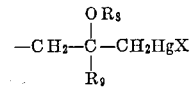

and $-CH_2OR_7$ and $R_1-R_4$ are selected from the group consisting of hydrogen, $-CH_2OR_7$, lower alkyl and phenyl, and at least two of the members $R_1-R_4$ and $R_6$, on different amino nitrogens, are $-CH_2OR_7$, where $R_7$, $R_8$ and $R_9$ are selected from the group consisting of hydrogen and lower alkyl, and X is an anionic radical which forms a salt of mercury.

No references cited.

NORMAN G. TORCHIN, *Primary Examiner.*

H. WOLMAN, *Assistant Examiner.*